Patented May 21, 1940

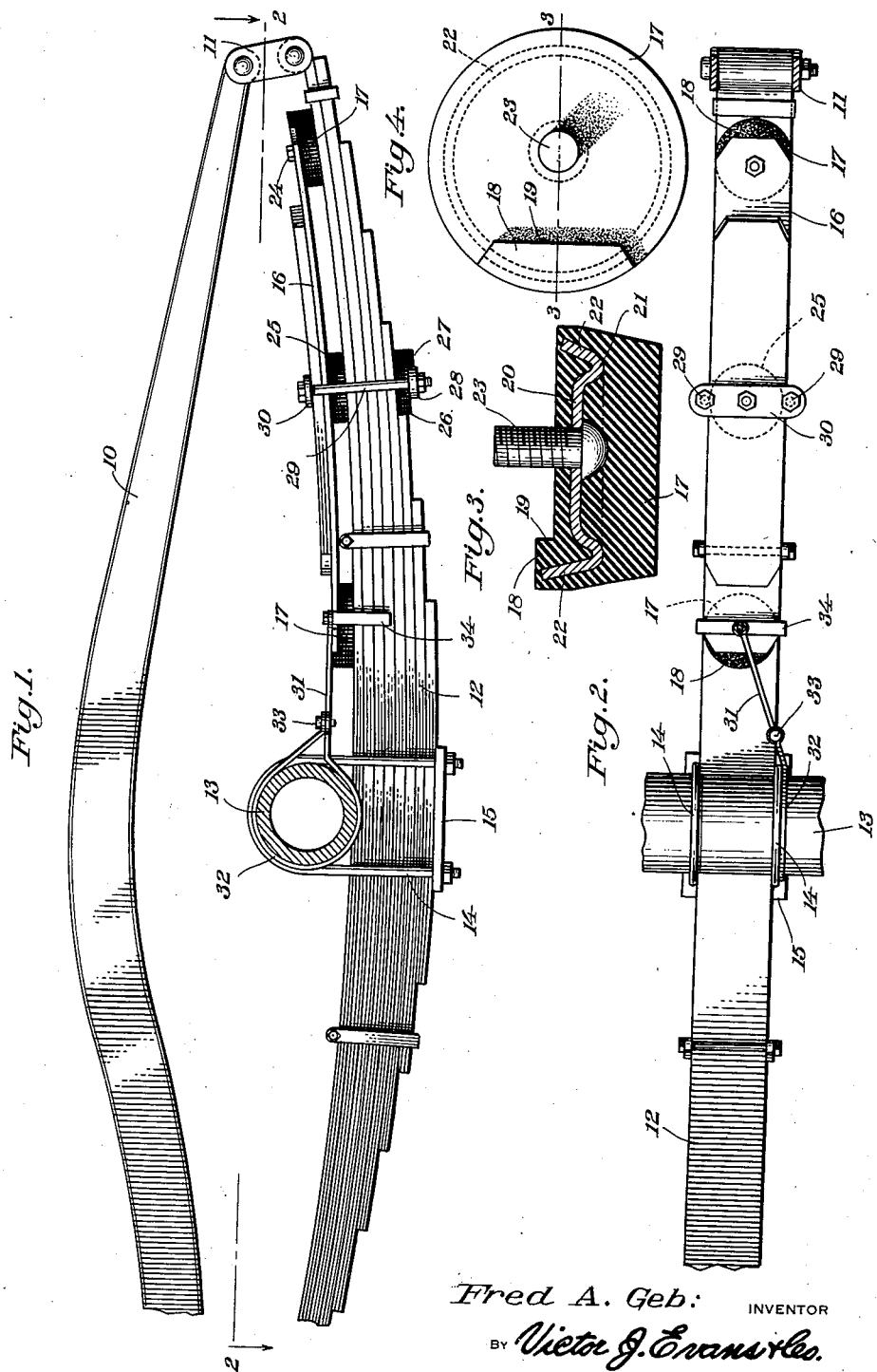

2,201,531

UNITED STATES PATENT OFFICE 2,201,531

SPRING STABILIZER

Fred A. Geb, Dallas, Tex.

Application October 3, 1939, Serial No. 297,741

3 Claims. (Cl. 267—48)

This invention relates to spring stabilizers and has for an object to provide a stabilizer which exerts a slight pressure on a leaf spring sufficient to follow the spring as it flexes down and snub the up throw of the spring, which further will prevent the axle twisting forward on rough roads and which will strengthen the spring when the brakes are being applied.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a fragmentary side elevation of a spring stabilizer constructed in accordance with the invention in applied position.

Figure 2 is a longitudinal sectional view taken on the line 2—2 of Figure 1 showing the stabilizer and top plan.

Figure 3 is an enlarged longitudinal sectional view of the rubber blocks of the stabilizer taken on the line 3—3 of Figure 4.

Figure 4 is a top plan view of the block shown in Figure 3.

Referring now to the drawing in which like characters of reference designate similar parts in the various views, 10 designates a chassis frame which is provided with a rear shackle 11 to which the rear end of a vehicle leaf spring 12 is secured, the leaf spring being suspended from the axle housing 13 by U bolts 14 and cross piece 15. These parts are conventional.

In carrying out the invention a stabilizing spring 16 composed of two leaves is superposed upon the vehicle leaf spring 12 between the axle housing 13 and rear shackle 11. Hard rubber blocks 17 are secured to the ends of the stabilizing spring and bear upon the vehicle spring.

Each block is provided on the upper face with a projection 18 forming a shoulder 19 to receive the respective end of the lower leaf of the stabilizing spring 16. Each lock has imbedded therein a reinforcing metal plate 20 having the ends crimped down as shown at 21 and then directed upward as shown at 22 to reinforce the block against distortion and to secure a screw 23 to the block. The head of the screw is disposed underneath the plate 20 and the nut 24 of the screw bars against the top of the stabilizing spring.

A hard rubber block 25 is disposed underneath the central portion of the stabilizing spring and a hard rubber block 26 is disposed underneath the vehicle spring. This latter block is a duplicate of the block 17 described above and has a shoulder 27 which abuts a cross bar 28 carried by bolts 29 which engage the sides of the vehicle springs and are connected at their upper ends by a cross bar 30 which bears upon the upper leaf of the stabilizing spring 16 at the center thereof.

A safety band 31 is attached at one end to the screw of the front rubber block and is looped around the axle as shown at 32 and then bolted upon itself as shown at 33. The safety band connects the stabilizing spring to the axle and prevents the axle twisting forward on rough roads and also strengthens the leaf spring of the vehicle when the brakes are applied.

For reinforcing and preventing dislodgement of the stabilizing spring an inverted U-shaped clip 34 is secured to the screw of the front rubber plug and the legs thereof extend downward along the sides of the leaf spring 12.

In operation the stabilizing spring 16 normally exerts slight pressure upon the leaf spring 12 of the vehicle and follows the leaf spring when it flexes downward. When the leaf spring flexes upward the stabilizing spring acts as a bumper to retard the spring's upthrow. The stabilizing spring in practice has been found to make possible smooth braking at all times and to reinforce the leaf spring when the brakes are applied.

From the above description it is thought that the construction and operation of the invention will be fully understood without further explanation.

What is claimed is:

1. The combination with a vehicle leaf spring, of a stabilizing spring superposed on the leaf spring, hard rubber blocks secured to the ends and center of the stabilizing spring and bearing upon the leaf spring, a clamp surrounding the stabilizing spring and leaf spring at a point centrally between the ends of the stabilizing spring, a hard rubber block disposed between the lower end of the clamp and the bottom of the leaf spring, and a safety band attached to the front end of the stabilizing spring and adapted to be passed about the rear axle housing of a vehicle.

2. The combination with a vehicle leaf spring, of a stabilizing spring superposed upon the leaf spring, hard rubber blocks disposed on the top face of the leaf spring having shoulders abutting the ends of the stabilizing spring, metal reinforcing plates indented in the blocks, securing screws having their heads engaged underneath the plates and projecting through the stabilizing springs, nuts on the screws bearing against top face of the stabilizing spring, a clamp surrounding the stabilizing spring and the leaf spring intermediate the ends of the stabilizing spring, and hard rubber blocks disposed between the top face of the stabilizing spring and top of the clamp and between the bottom face of the leaf spring and bottom of the clamp.

3. The combination with a vehicle leaf spring, of a stabilizing spring superposed upon the leaf spring, hard rubber blocks secured to the ends and to the center of the stabilizing spring and bearing upon the leaf spring, an inverted U-shaped guide member secured to the stabilizing spring at one end thereof and bearing against the sides of the leaf spring to assure alignment of the stabilizing spring with the leaf spring, a clamp surrounding the stabilizing spring and the leaf spring at the center of the stabilizing spring, and a hard rubber block within the clamp disposed below the leaf spring.

FRED A. GEB.